United States Patent [19]

Evers

[11] 4,147,858

[45] Apr. 3, 1979

[54] FLUOROCARBON ETHER BIBENZOXAZOLE OLIGOMERS CONTAINING REACTIVE ACETYLENIC TERMINAL GROUPS

[75] Inventor: Robert C. Evers, Dayton, Ohio

[73] Assignee: The United States of America as represented by the Secretary of the Air Force, Washington, D.C.

[21] Appl. No.: 925,900

[22] Filed: Jul. 19, 1978

[51] Int. Cl.$^2$ .............................................. C08G 73/22
[52] U.S. Cl. ................................. 528/210; 260/307 D; 526/247; 526/259; 526/260; 526/285; 528/205; 528/211
[58] Field of Search ............... 526/247, 259, 260, 285; 528/205, 210, 211; 260/307 D

[56] References Cited

U.S. PATENT DOCUMENTS

| 4,053,495 | 10/1977 | Evers | 528/210 |
| 4,064,109 | 12/1977 | Evers | 528/210 |

*Primary Examiner*—Lester L. Lee
*Attorney, Agent, or Firm*—Joseph E. Rusz; Cedric H. Kuhn

[57] ABSTRACT

Fluorocarbon ether bibenzoxazole oligomers having reactive terminal acetylenic groups which make it possible to thermally cure the oligomers without the evolution of volatiles to rubbery vulcanizates exhibiting high thermooxidative stability and low temperature flexibility, properties that render the materials suitable for various aerospace applications such as for seals and sealants.

6 Claims, No Drawings

FLUOROCARBON ETHER BIBENZOXAZOLE OLIGOMERS CONTAINING REACTIVE ACETYLENIC TERMINAL GROUPS

RIGHTS OF THE GOVERNMENT

The invention described herein may be manufactured and used by or for the Government of the United States for all governmental purposes without the payment of any royalty.

FIELD OF THE INVENTION

This invention relates to fluorocarbon ether bibenzoxazole oligomers containing acetylenic end groups. In one aspect the invention relates to a process for preparing the oligomers.

BACKGROUND OF THE INVENTION

Considerable research work has been conducted with the view of furnishing thermally stable, elastomeric polymers for various aerospace seal and sealant applications. To meet the rigid requirements of such applications, a polymer must also retain its elastomeric properties at sub-zero temperatures. Polymers that advance the art in meeting the requirements are disclosed by me in U.S. Pat. Nos. 3,846,376; 3,994,861 and 4,064,109.

In the above-cited patents, fluorocarbon ether bibenzoxazole polymers are disclosed that possess a combination of high thermooxidative stability and low glass transition temperatures. In order to exhibit elastomeric properties, these moderate to high molecular weight polymers must be cured. The preferred method of cure is a magnesium oxide-benzoyl peroxide catalyzed cure through aliphatic or olefinic cure sites incorporated within the backbone of the polymer chain. The benzoyl peroxide and magnesium oxide are admixed with the polymer through milling prior to curing. During curing of the formulated polymers, volatiles are evolved with the result that voids may form in the cured products. Thus, there is a need for a fluorocarbon ether bibenzoxazole oligomer that can be thermally cured without prior admixture of the magnesium oxide-benzoyl peroxide catalyst and without the subsequent evolution of volatiles to an elastomer exhibiting high thermooxidative stability and low temperature flexibility.

It is a principal object of this invention, therefore, to provide fluorocarbon ether bibenzoxazole oligomers with reactive acetylenic terminal groups which make possible a volatile-free cure of the oligomers to rubbery vulcanizates possessing a combination of thermooxidative stability and low glass transition temperatures.

A further object of the invention is to provide fluorocarbon ether bibenzoxazole oligomers which can be thermally cured, thereby eliminating the requirement of employing a curing catalyst.

Another object of the invention is to provide a process for synthesizing the oligomers.

Other objects and advantages of the invention will become apparent to those skilled in the art upon consideration of the accompanying disclosure.

SUMMARY OF THE INVENTION

The present invention resides in fluorocarbon ether bibenzoxazole oligomers having the following formula:

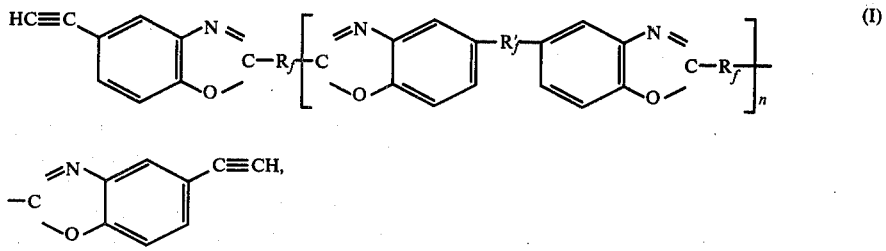

wherein $R_f$ is $CF_2(OCF_2CF_2)_xO(CF_2)_5O(CF_2CF_2O)_yCF_2$, where $x + y$ equals 4 to 7 inclusive, $CF_2O(CF_2)_2OCF_2$, $(CF_2)_4O(CF_2)_2OCF_2$, $(CF_2)_4O(CF_2)_4$-$O(CF_2)_4$, or $$(CF_2)_4(OCFCF_2)_aO(CF_2)_4O(CF_2CFO)_a(CF_2)_4,$$
$$\phantom{(CF_2)_4(O}|\phantom{CFCF_2)_aO(CF_2)_4O(CF_2C}|$$
$$\phantom{(CF_2)_4(OC}CF_3 \phantom{FCF_2)_aO(CF_2)_4O(CF_2CF}CF_3$$

where a is an integer from 1 to 5, inclusive; $R_f'$ is $(CF_2)_2O(CF_2)_5O(CF_2)_2$, $$(CF_2)_2OCF_2CFO(CF_2)_2OCFCF_2O(CF_2)_2,$$
$$\phantom{(CF_2)_2OCF_2C}|\phantom{FO(CF_2)_2OCF}|$$
$$\phantom{(CF_2)_2OCF_2CF}CF_3 \phantom{O(CF_2)_2OC}CF_3$$

$(CF_2)_2O(CF_2)_2O(CF_2)_2O(CF_2)_5$-$O(CF_2)_2$, or $(CF_2)_2O(CF_2)_2O(CF_2)_2$; and n is an integer from 1 to 4, inclusive.

In one embodiment, the present invention is concerned with a process for preparing the fluorocarbon ether bibenzoxazole oligomers by initially reacting in an inert atmosphere certain perfluoroalkylene ether diimidate esters and certain perfluoroalkylene ether bis(o-aminophenols) and then continuing the reaction after addition of 2-amino-4-ethynylphenol. The polycondensation reaction is conducted in a solvent in the presence of glacial acetic acid. Gases suitable for providing an inert atmosphere include nitrogen, helium and argon.

The monomers and endcapping agent used and the condensation reaction involved in preparing the oligomers of this invention are illustrated by the following equation:

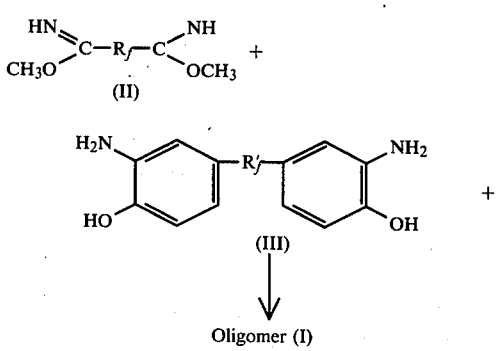

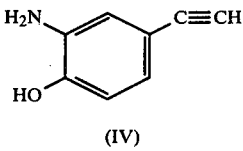

(IV)

In the foregoing equation, $R_f$ and $R_4'$ are as indicated hereinabove. From the equation it is seen that the source of the $R_f$ group is the diimidate ester (II) while the source of the $R_f'$ group is the bis-(o-aminophenol) (III). 2-Amino-4-ethynylphenol (IV), the endcapping agent, is the source of the terminal acetylenic groups.

In carrying out the condensation reaction, the diimidate ester is reacted with the bis(o-aminophenol) in a mole ratio that is dependent upon the number of repeating units in the oligomer, i.e., on the value of n. In general, the mole ratio of bis(o-aminophenol) to diimidate ester ranges from 0.5 to 0.8:1. The specific molar relationships of the monomers required for the several values of n are shown below in the table.

TABLE

| n | Diimidate Ester | Bis(o-aminophenol) |
|---|---|---|
| 1 | 1 | 0.5 |
| 2 | 1 | 0.67 |
| 3 | 1 | 0.75 |
| 4 | 1 | 0.80 |

The mole ratio of glacial acetic acid to diimidate ester is at least 2:1, e.g., 2 to 4:1. The acetic acid reacts with ammonia formed during the condensation reaction, converting it to ammonium acetate and thereby driving the reaction to completion.

The condensation reaction is carried out in a mixture of methylene chloride and a halogenated hydrocarbon, such as 1,1,2-trichloro-1,2,2-trifluoroethane. The methylene chloride is used to solubilize the bis(o-aminophenol) while the halogenated hydrocarbon maintains the oligomer in solution during the reaction. The initial reaction of the diimidate ester and the bis(o-aminophenol) is conducted at a temperature ranging from about 40° to 60° C. for a period of time sufficient to complete or substantially complete the reaction. A reaction period of about 12 to 48 hours is usually adequate to accomplish this result. The 2-amino-4-ethynylphenol is then added to the reaction mixture along with additional glacial acetic acid. In general, the mole ratio of the 2-amino-4-ethynylphenol endcapping agent to diimidate ester ranges from about 0.4 to 1:1. The specific molar relationships of 2-amino-4-ethynylphenol to diimidate ester for the several values of n are shown below in the table.

TABLE

| n | Diimidate Ester | Endcapping Agent |
|---|---|---|
| 1 | 1 | 1 |
| 2 | 1 | 0.67 |
| 3 | 1 | 0.50 |
| 4 | 1 | 0.40 |

It is usually preferred to employ a small excess of the 2-amino-4-ethynylphenol in order to ensure that the oligomer contains acetylenic end groups. The additional amount of glacial acetic acid added with the endcapping agent is generally about the same as that used in the initial reaction, i.e., at least 2 moles of the acid per mole of diimidate ester.

After addition of the 2-amino-4-ethynylphenol, the reaction is continued for a period of about 12 to 24 hours at about the same reaction temperature. The oligomer containing acetylenic terminal groups is then recovered by conventional techniques from the reaction mixture.

The diimidate esters used in preparing the oligomers of this invention correspond to formula II above in which $R_f$ is one of the following numbered groups:
1. $CF_2(OCF_2CF_2)_xO(CF_2)_5O(CF_2CF_2O)_yCF_2$, where x + y equals 4 to 7, inclusive,
2. $CF_2O(CF_2)_2OCF_2$,
3. $(CF_2)_4O(CF_2)_2OCF_2$,
4. $(CF_2)_4O(CF_2)_4O(CF_2)_4$, or 5. $(CF_2)_4(OCFCF_2)_aO(CF_2)_4O(CF_2CFO)_a(CF_2)_4$,
            |                           |
            $CF_3$                $CF_3$ where a is an integer from 1 to 5, inclusive. The diimidate ester containing group 2, namely, dimethyl perfluoro-3,6-dioxasuberimidate, is a well known compound that is described in the literature. The preparation of the diimidate ester containing group 3, namely, dimethyl perfluoro-3,6-dioxanudecanediimidate, is described in above-mentioned U.S. Pat. No. 3,846,376. The preparation of the diimidate esters containing groups 4 and 5 is described in U.S. Pat. No. 4,011,255, issued to C. Tamborski on Mar. 8, 1977. The preparation of the diimidate ester containing group 1 where x + y equals 4 or 7 is described in U.S. Pat. No. 3,994,861, issued to me on Nov. 30, 1976. The disclosures of these patents are incorporated herein by reference. The preparation of the diimidate esters containing group 1 where x + y equals 5 and 6 is described hereinafter in Examples I and II.

The following bis(o-aminophenol) compounds (formula III) are used in synthesizing the oligomers of this invention:
1. 1,11-bis(3-amino-4-hydroxyphenyl)perfluoro-3,9-dioxaundecane,
2. 1,14-bis(3-amino-4-hydroxyphenyl)perfluoro-5,10-dimethyl-3,6,9,12-tetraoxatetradecane,
3. 1,17-bis(3-amino-4-hydroxyphenyl)perfluoro-3,6,9,15-tetraoxaheptadecane, and
4. 1,8-bis(3-amino-4-hydroxyphenyl)perfluoro-3,6-dioxaoctane.

The above-listed compounds can be represented by formula III above. In this formula $R_f'$ is one of the following groups:
1. $(CF_2)_2O(CF_2)_5O(CF_2)_2$, 2. $(CF_2)_2OCF_2CFO(CF_2)_2OCFCFO(CF_2)_2$,
               |                  |
              $CF_3$           $CF_3$ 3. $(CF_2)_2O(CF_2)_2O(CF_2)_2O(CF_2)_5O(CF_2)_2$, or
4. $(CF_2)_2O(CF_2)_2O(CF_2)_2$.

The preparation of the first of the above-mentioned bis(o-aminophenol) compounds is described in U.S. Pat. No. 3,846,376, issued to me on Nov. 5, 1974, while the preparation of the second and third of the above-mentioned bis(o-aminophenol) compounds is described in U.S. Pat. No. 4,005,142, issued to me on Sept. 5, 1975. The preparation of the fourth of the above-mentioned bis(o-aminophenol) compounds is described in my copending patent application Ser. No. 817,658, filed on July 21, 1977, and issued on Sept. 19, 1978, as U.S. Pat. No. 4,115,367. The disclosures of the aforementioned patents and patent application are incorporated herein by reference.

The endcapping agent 3-amino-4-ethynylphenol is a new compound which is prepared by a four-step synthetic sequence. In the first step 4-hydroxy-3-nitroacetophenone is reacted with acetic anhydride to give 4-acetoxy-3-nitroacetophenone. The 4-acetoxy-3-nitroacetophenone is then treated in the second step with a Vilsmeier reagent derived from N,N-dimethylformamide and phosphorus oxychloride. The product obtained is 4-acetoxy-3-nitro-β-chlorocinnamaldehyde which in the third step is added to a solution of sodium hydroxide. In the reaction that occurs, the ester group is hydrolyzed, and hydrogen chloride and carbon monoxide are simultaneously eliminated. The product obtained in the third step is 4-ethynyl-2-nitrophenol. In the fourth and final step, 4-ethynyl-2-nitrophenol is dissolved in a solution of potassium carbonate to which sodium dithionite is added. The latter compound acts as a reducing agent, and 2-amino-4-ethynylphenol is recovered as the product of the four-step process. A detailed description of the process is disclosed in commonly assigned copending U.S. Pat. application Ser. No. 925,899, filed on July 19, 1978, the disclosure of which is incorporated herein by reference.

A more comprehensive understanding of the invention can be obtained by referring to the following illustrative examples which are not intended, however, to be unduly limitative of the invention.

EXAMPLE I

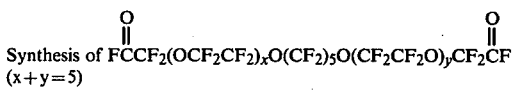

Synthesis of $FCCF_2(OCF_2CF_2)_xO(CF_2)_5O(CF_2CF_2O)_yCF_2CF$ (x+y=5) (a)

Hexafluoroglutaryl fluoride (430 g, 1.73 mole) was added to a slurry of cesium fluoride (10 g) in tetraglyme (200 ml) and the mixture was stirred at 35° to 40° C. for one-half hour. The mixture was cooled to −5° C. to −10° C. and tetrafluoroethylene oxide was added through a vacuum manifold under a total pressure of 300–400 mm Hg. The reaction was monitored by frequent sampling and gas chromatographic analysis. It was terminated when 1880 g (9.2 moles) of tetrafluoroethylene oxide has been added. After warming to room temperature, the reaction product was separated from the solvent as the heavy phase (2020 g). Gas chromatographic analysis of the product showed the following composition:

x+y=3, 13.2%; x+y=4, 20.0%; x+y=5, 36.8%; x+y=6, 14.27%;
other, 15.8% (mostly tetrafluoroethylene oxide homooligomers).

Distillation on a 15-plate Oldershaw column gave 151 g of x+y=3 (b.p. 70°–79° C./1–2 mm Hg); 200 g of x+y=4 (b.p. 92°–93° C./2 mm Hg); and 115 g of x+y=5 (b.p. 109°–119° C./2–3 mm Hg) and intermediate fractions. The residue (840 g) of a 1:1 mixture of x+y=5 and x+y=6 was converted to the dimethyl esters as described below.

Synthesis of: (b)

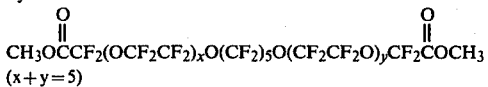

$CH_3OCCF_2(OCF_2CF_2)_xO(CF_2)_5O(CF_2CF_2O)_yCF_2COCH_3$ (x+y=5)

The mixture of x+y=5 and x+y=6 (840 g) as prepared in (a) above was added rapidly to an excess of methanol contained in a polyethylene bottle and stirred with a magnetic stirrer. After the exothermic reaction subsided, the reaction mixture was washed with water, dried and distilled. Fractionation gave 352 g of dimethyl ester (x+y=5) b.p. 145°–147° C./0.8 mm) along with a higher boiling fraction containing impure dimethyl ester (x+y=6).

(c) Synthesis of $NCCF_2(OCF_2CF_2)_xO(CF_2)_5O(CF_2CF_2O)_yCF_2CN$ (x+y=5)

The pure dimethyl ester (x+y=5) (352 g), prepared as described in (b) above, was dissolved in 1,1,2-trichloro-1,2,2-trifluoroethane and stirred in a 2-liter flask equipped with a dry ice-acetone condenser and a gas inlet tube. Anhydrous ammonia was added until it was heavily refluxing in the condenser. The mixture was refluxed for several hours and then ammonia was allowed to escape. The solvent was removed under vacuum leaving 336 g of crude solid diamide in the flask. The diamide was mixed with phosphorous pentoxide (500 g) and heated at 200° to 230° C. for several hours after which the crude dinitrile formed was removed under vacuum (297 g, 88.4% yield). Distillation gave 267 g of the pure dinitrile (x+y=5) (b.p. 88°–90° C./0.3 mm Hg). The infrared spectral data and the $^1H$ and $^{19}F$ nuclear magnetic resonance data were consistent with the dinitrile structure.

Synthesis of (d)

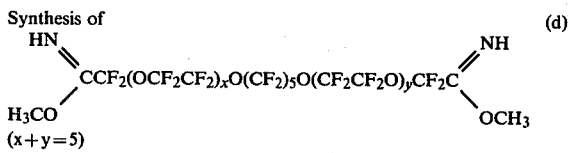

(x+y=5)

The dinitrile (x+y=5) (20.0 g, 0.020 mole), prepared as described in (c) above, was added dropwise under nitrogen to a stirred solution of 0.8 g of dry triethylamine in 60 ml of anhydrous methanol. The resultant two-phase solution was stirred at reflux for 14 hours at which time the excess methanol and triethylamine were stripped off under reduced pressure. Distillation of the oily residue gave a center cut of 11.7 g (55% yield) of viscous, water-white product (b.p. 118° C./0.02 mm Hg).

Analysis Calc'd: C,23.39; H,0.75; N,2.60 Found: C,23.75; H,0.58; N,2.40

Molecular Weight (mass spectroscopy): Calc'd - 1078 Found - 1078

EXAMPLE II

Synthesis of

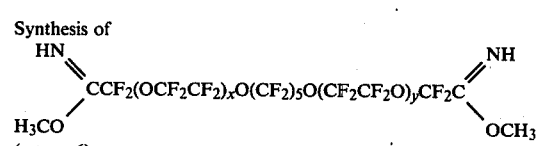

(x+y=6)

The dinitrile $NCCF_2(OCF_2CF_2)_xO(CF_2)_5O(CF_2CF_2O)_yCF_2CN$ (x+y=6) (20.0 g, 0.018 mole), prepared according to the procedure described in commonly assigned U.S. Pat. No. 3,960,914, was added dropwise under nitrogen to a stirred solution of 0.8 g of dry triethylamine in 60 ml of anhydrous methanol. The resultant two-phase solution was stirred at reflux for 48 hours. Excess methanol and triethylamine were stripped under reduced pressure from the two-phase reaction mixture. Distillation of the oily residue gave a center cut of 14.6 g (68% yield) of viscous, water-white product (b.p. 124°–125° C./0.03 mm Hg).

Analysis: Calc'd: C,23.13; H,0.69; N,2.34 Found: C,23.16; H,0.51; N,2.39

Molecular Weight (mass spectroscopy): Calc'd - 1194 Found - 1194

EXAMPLE III

A run was carried out in which a fluorocarbon ether bibenzoxazole oligomer having terminal acetylenic groups was prepared in a condensation reaction as described below and as represented by the following equation:

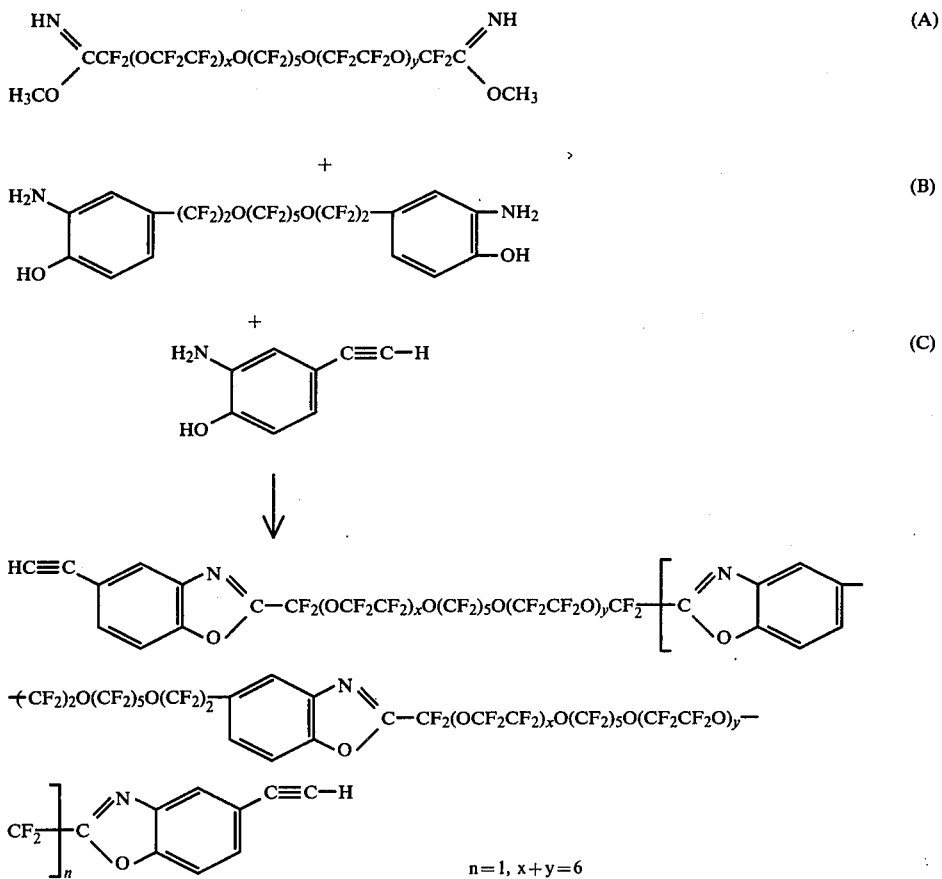

Diimidate ester A (3.586 g, 0.0030 mole) and glacial acetic acid (0.380 g, 0.0063 mole) were dissolved in a mixture of 60 ml of 1,1,2-trichloro-1,2,2-trifluoroethane (Freon 113) and 45 ml of methylene chloride at 45° C. To this clear solution was added bis(o-aminophenol) B (1.048 g, 0.0015 mole) in four portions over the course of an hour. After stirring under nitrogen at 45° C. for 22 hours, the acetylenic compound C (0.445 g, 0.0033 mole) and additional glacial acetic acid (0.380 g, 0.0063 mole) in 15 ml of methylene chloride were added to the clear, pale yellow reaction mixture. The reaction was continued for an additional 20 hours at which time the clear reaction mixture was transferred to a separatory funnel. It was washed successively with water, dilute sodium bicarbonate solution, and again with water. The organic layer was then dried over anhydrous magnesium sulfate, treated with charcoal, and reduced in volume to approximately 15 ml. The clear concentrated solution was transferred to a vial and the remaining organic solvents were carefully removed at 58° C. and 0.01 mm pressure to yield 4.36 g (86% yield) of viscous, pale yellow oligomer.

Analysis: Calc'd: C,30.05; H,0.47; N,1.77 Found: C,30.20; H,0.10; N,1.68.

Infrared spectral analysis confirmed the presence of the terminal acetylene groups and the absence of unreacted o-aminophenol and imidate ester moieties. Differential scanning calorimetry revealed that the oligomer has a glass transition temperature (Tg) of −60° C. Onset of reaction of the terminal acetylenic groups was shown to occur at 195° C. with the maximum rate of reaction being at 280° C. The sample was held in the differential scanning calorimeter at 300° C. for 30 minutes to give a cured, insoluble rubbery product which exhibited a Tg of −46° C.

Approximately one gram of the liquid oligomer was placed in a steel mold and was heated at 160° C. for 16 hours and at 185° C. for twenty-four hours to give a transparent, reddish-brown rubber. Additional heating at 240° C. for three hours did not appear to further advance the cure. The soft, flexible rubber exhibited a Tg of −45° C.

EXAMPLE IV

A series of runs was conducted in which fluorocarbon ether bibenzoxazole oligomers containing reactive acetylenic terminal groups were synthesized. The same monomers (except for x + y value) were used as in Example III, and the procedure followed in each run was essentially the same as that described in Example III. Pertinent details of the runs are summarized in Table I below while in Table II below various properties of the oligomers are listed.

TABLE I

| Product | Diimidate Ester- mmoles | Bis(o-amino-phenol) mmoles | Acetylenic Compound- mmoles | Acetic Acid- mmoles | Freon 113- ml | $CH_2Cl_2$- ml | Reaction time/hrs |
|---|---|---|---|---|---|---|---|
| n=0, x+y=5 | 0.50 | 0 | 1.10 | 2.10 | 0 | 12 | 48 |
| n=0, x+y=6 | 0.50 | 0 | 1.11 | 2.07 | 5 | 10 | 42 |
| n=1, x+y=5 | 1.00 | 0.50 | 1.10 | 4.10 | 15 | 25 | 36 |
| n=1, x+y=6 | 3.00 | 1.50 | 3.30 | 12.60 | 60 | 60 | 42 |
| n=2, x+y=5 | 0.75 | 0.50 | 0.55 | 5.79 | 20 | 20 | 28 |
| n=2, x+y=6 | 1.50 | 1.00 | 1.10 | 6.20 | 40 | 55 | 42 |

OLIGOMER PREPARATION[1]

[1] All reactions were carried out at approximately 45° C.

TABLE II

OLIGOMER PROPERTIES

| Product | Elemental Analysis-% Cal'd C | H | N | Found C | H | N | Initial Tg- [1] ° C. | [1] Initial Tm-° C. | Onset [2] Rxn-° C. | Max [3] Rxn-° C. | Cured Tg-° C. |
|---|---|---|---|---|---|---|---|---|---|---|---|
| n=0, x+y=5 | 33.73 | 0.65 | 2.25 | 33.10 | 0.34 | 2.37 | — | 49 | 175 | 268 | 4 |
| n=0, x+y=6 | 32.62 | 0.59 | 2.06 | 32.74 | 0.22 | 2.09 | — | 41 | 175 | 268 | (4) |
| n=1, x+y=5 | 30.80 | 0.48 | 1.91 | 30.82 | 0.47 | 2.15 | −56 | 22 | 180 | 285 | −45 |
| n=1, x+y=6 | 30.05 | 0.47 | 1.77 | 30.20 | 0.10 | 1.68 | −60 | — | 195 | 280 | −45 (5) |
| n=2, x+y=5 | 30.00 | 0.44 | 1.82 | 29.42 | 0.21 | 2.08 | −54 | — | 190 | 318 | −45 |
| n=2, x+y=6 | 29.35 | 0.41 | 1.70 | 29.37 | 0.13 | 1.77 | −61 | — | 200 | 318 | −55 |

(1) All temperature values in the table [glass transition temperature (Tg); melting point temperature (Tm) were determined by differential scanning calorimetry (Δ=20° C./min).
(2) Temperature at which onset of reaction of terminal acetylenic groups occurred.
(3) Temperature at which maximum rate of reaction of terminal acetylenic groups occurred.
(4) No Tg could be observed for the densely crosslinked material.
(5) Tg on rubber sample heated in mold with cure cycle of 160 to 240° C. was −45° C.

As seen from the foregoing, the present invention provides fluorocarbon ether bibenzoxazole oligomers having reactive acetylenic terminal groups. Because of the presence of these groups, the oligomers can be cured thermally to rubbery vulcanizates without the undesirable evolution of volatiles and without the necessity of milling in a curing catalyst. The lower molecular weight oligomers (n = 0) were liquid only at a temperature above room temperature and were converted upon curing into relatively hard vulcanizates because of a high crosslink density. The higher molecular weight oligomers (n ≧ 1) on the other hand cured to flexible vulcanizates having a broad use temperature range, properties that render the materials suitable for many aerospace applications such as for seals and sealants.

As will be evident to those skilled in the art, modifications of the present invention can be made in view of the foregoing disclosure without departing from the spirit and scope of the invention.

I claim:

1. A fluorocarbon ether bibenzoxazole oligomer having the following structural formula:

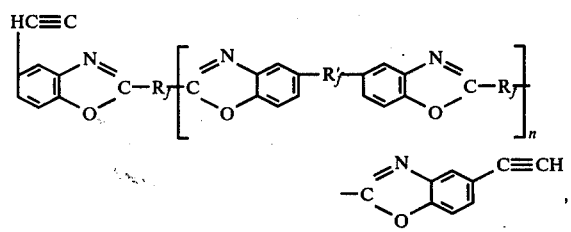

wherein $R_f$ is $CF_2(OCF_2CF_2)_xO(CF_2)_5O(CF_2CF_2O)_yCF_2$, where x + y equals 4 to 7, inclusive, $CF_2O(CF_2)_2OCF_2$, $(CF_2)_4O(CF_2)_2OCF_2$, $(CF_2)_4O(CF_2)_4O(CF_2)_4$, or

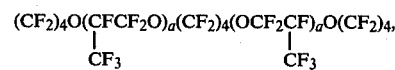

where a is 1 to 5, inclusive; $R_f'$ is $(CF_2)_2O(CF_2)_5O(CF_2)_2$,

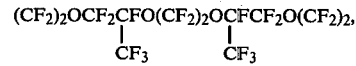

$(CF_2)_2O(CF_2)_2O(CF_2)_2O(CF_2)_5O(CF_2)_2$, or $(CF_2)_2O(CF_2)_2O(CF_2)_2$; and n is from 1 to 4, inclusive.

2. The oligomer according to claim 1 in which $R_f$ is $CF_2(OCF_2CF_2)_xO(CF_2)_5O(CF_2CF_2O)_yCF_2$, where x + y equals 4 to 7, inclusive, and $R_f'$ is $(CF_2)_2O(CF_2)_5O(CF_2)_2$.

3. The oligomer according to claim 1 in which $R_f$ is $CF_2(OCF_2CF_2)_xO(CF_2)_5O(CF_2CF_2O)_yCF_2$, where x + y equals 4 to 7, inclusive, and $R_f'$ is $(CF_2)_2O(CF_2)_2O(CF_2)_2$.

4. The oligomer according to claim 1 in which $R_f$ is $CF_2(OCF_2CF_2)_xO(CF_2)_5O(CF_2CF_2O)_yCF_2$, where x + y equals 4 to 7, inclusive, and $R_f'$ is $(CF_2)_2O(CF_2)_2O(CF_2)_2O(CF_2)_5O(CF_2)_2$.

5. The oligomer according to claim 1 in which $R_f$ is $(CF_2)_4O(CF_2)_2OCF_2$ and $R_f'$ is $(CF_2)_2O(CF_2)_5O(CF_2)_2$.

6. The oligomer according to claim 1 in which $R_f$ is $(CF_2)_4O(CF_2)_4O(CF_2)_4$ and $R_f'$ is $(CF_2)_2O(CF_2)_5O(CF_2)_2$.

* * * * *

UNITED STATES PATENT AND TRADEMARK OFFICE
CERTIFICATE OF CORRECTION

PATENT NO. : 4,147,858

DATED : April 3, 1979

INVENTOR(S) : Robert C. Evers

It is certified that error appears in the above–identified patent and that said Letters Patent are hereby corrected as shown below:

Column 3, line 8, "$R_4^1$" should read -- $R_f^1$ --. Column 4, line 22, "dioxanudecanediimidate" should read -- dioxaundecanediimidate --.

Signed and Sealed this

Thirty-first Day of July 1979

[SEAL]

Attest:

Attesting Officer

LUTRELLE F. PARKER
Acting Commissioner of Patents and Trademarks